United States Patent
Govindarajan

(12) 
(10) Patent No.: US 6,222,877 B1
(45) Date of Patent: Apr. 24, 2001

(54) METHOD FOR PERFORMANCE MONITORING OF DATA TRANSPARENT COMMUNICATION LINKS

(75) Inventor: Madabusi Govindarajan, Sunnyvale, CA (US)

(73) Assignee: LuxN, Inc., Sunnyvale, CA (US)

( * ) Notice: Subject to any disclaimer, the term of this patent is extended or adjusted under 35 U.S.C. 154(b) by 0 days.

(21) Appl. No.: 09/442,878

(22) Filed: Nov. 18, 1999

Related U.S. Application Data

(60) Provisional application No. 60/143,902, filed on Jul. 14, 1999.

(51) Int. Cl.$^7$ ................................ H04B 3/46; G06F 11/00
(52) U.S. Cl. ............................................. 375/224; 714/705
(58) Field of Search ................................... 375/224, 225, 375/226, 227, 228; 714/704, 705, 706, 707, 708

(56) References Cited

U.S. PATENT DOCUMENTS

| | | | |
|---|---|---|---|
| 3,721,959 | 3/1973 | George | 340/146.1 |
| 4,034,340 | * 7/1977 | Sana'Agostino | 714/705 |
| 4,097,697 | * 6/1978 | Harman | 714/704 |
| 4,234,954 | 11/1980 | Lange et al. | 371/6 |
| 4,367,550 | * 1/1983 | Douverne | 714/705 |
| 4,580,263 | * 4/1986 | Watanabe et al. | 714/705 |
| 4,633,465 | 12/1986 | Fitch et al. | 371/6 |
| 5,333,147 | 7/1994 | Nohara et al. | 375/10 |

OTHER PUBLICATIONS

B. W. Sprinkle, "Fast and Accurate Testing of ISDN S/T Interface Devices Using Pseudo Error Rate Technique," Proceeding of 1990 International Test Conference, pp. 80–85, Sep. 1990.*

"Multiple Phase Pseudo–Error Rate Monitor," IBM Technical Disclosure Bulletin, pp. 211–213, Jul. 1991.*

\* cited by examiner

*Primary Examiner*—Stephen Chin
*Assistant Examiner*—Chieh M. Fan
(74) *Attorney, Agent, or Firm*—David H. Jaffer; Pillsbury Madison & Sutro LLP

(57) ABSTRACT

A method for performance monitoring of data transparent communication links, including a method wherein each symbol in an incoming data symbol stream is sampled at the center of each bit period to create a main line data bit stream, and concurrently sampled at a time instant displaced from the center of each bit period to create a second line data bit stream. During each bit period, the digital value of the second line data stream is compared with the digital value for the corresponding bit period in the main line. If the main line and second line digital values are the same, no error is indicated. If they are different, i.e. if, for example, the main line is bit "1" and the second line is bit zero, an error called a pseudo error is entered on a counter. The number of errors counted per number of bits or time is indicated as a pseudo error rate for each point of time displacement in the user-defined set. A pseudo error rate reference curve is independently, and previously determined and stored in a controller that indicates maximum allowable pseudo error rate data as a function of the time displacement from the center of the bit period. The values of the calculated pseudo error rate are compared with the corresponding points on the reference curve, and the deviation from the reference curve is quantified by a newly defined quantity termed a "transmission safety factor". If this factor is below a predetermined level, an alarm/notice is activated to indicate degraded performance.

3 Claims, 4 Drawing Sheets

METHOD FOR PERFORMANCE MONITORING OF DATA TRANSPARENT COMMUNICATION LINKS

This application claims priority to a Provisional Application Ser. No. 60/143,902, filed Jul. 14, 1999.

BACKGROUND OF THE INVENTION

1. Field Of The Invention

The present invention relates generally to transmission of digital data through a communications link, and more particularly to a method of evaluating an incoming signal that is carrying digital data, in order to estimate the data transmission accuracy of this signal.

2. Description Of The Prior Art

Digital data transmission is a well-known and ubiquitous component of existing communication techniques. In the following text, the term "digital data transmission" will apply to the transmission of binary digital data, though such use does not exclude situations where the radix of transmitted numerals is greater than two. Following common usage in technical literature, the contraction "bit" will stand for "binary digit". Again, following common usage in the data communications field, the term "data symbol" will be used to stand for a pre-defined physical representation assigned to a given data bit such that data transmission can be physically executed through the communication channel. The physical form of the data symbol depends on the modulation technique employed, and can take the form of a voltage, current, optical intensity, or some other dimensioned physical parameter. In order to effect the transmission of multiple digital data bits, it is common to restrict each data symbol to ideally occupy a finite interval of time termed as a "bit period". A succession of data symbols injected into the communication channel by a suitable transmission mechanism constitutes the transmission of multiple data bits. It is common in the digital communications field to employ a nominally periodic "transmitter clock signal" in order to delineate the finite intervals of time to be occupied by each data symbol. The receiver of a digital data transmission link first receives, or extracts, the physical data symbols out of the communication channel. It is well-known that the physical characteristics of a channel can attenuate and distort the transmitted data symbols. Thus, the received data symbols are in general a degraded version of the corresponding transmitted data symbols. The receiver performs a "decision" operation whereby each received data symbol is mapped back to its corresponding data bit. The timing of the decision process is co-ordinated by a "receiver clock signal", often extracted from the incoming data symbols themselves by a well-known procedure known as "clock recovery". A common embodiment of the decision operation in the case of voltage symbols is to employ a clocked regenerative comparator circuit, sometimes referred to as a "decision circuit" or "flip-flop". Ideally, the decision operation occurs instantaneously at the instants of time specified by the receiver clock signal. The instantaneous decision process will be referred to as "sampling" of the data symbols.

An important step in achieving quality digital data transmission is detecting situations when the transmission is inaccurate. The inaccuracy of a transmission link is manifested in the form of bit errors, i.e., a transmitted bit being incorrectly identified at the receiver (including the catastrophic situation when none of the transmitted bits are properly identified at the receiver). Typical causes of bit errors in a digital data transmission link include the following:

1. Random additive white Gaussian noise (AWGN) distorts the amplitude of the data symbols and can cause independent bit errors when the signal-to-noise ratio becomes small.

2. Deterministic symbol degradations such as intersymbol interference (ISI), in conjunction with AWGN, can cause data pattern-dependent bit errors.

3. Timing jitter in the receiver clock signal can cause both independent as well as pattern-dependent bit errors.

The degradations described above can be aggravated by factors such as component aging, fluctuations in ambient operating conditions existing in the data transmission link, and catastrophic device degradation.

The primary performance metric for characterizing the occurrence of bit errors is the bit error rate (BER) of a link, defined as the relative frequency of bit errors over a given time interval for a given sequence of data bits. The maximum acceptable bit error rate (BER) of a digital data transmission link is usually a number much smaller than unity, such as $10^{-12}$. The BER measurement is typically defined for a test bit pattern such as a pseudo-random bit sequence (PRBS) of a particular periodicity. A BER of $10^{-12}$ means that on average, 1 bit error occurs for every 1 trillion consecutive data bits. It is important to note that depending on the statistics of the failure mechanism, there could be many intervals of 1 trillion bits where no errors occur, while many other such intervals contain more than one bit error. Hence, along with the BER, other metrics such as Error Free Seconds (EFS) and Severely Errored Seconds (SES) are employed to characterize a link.

Real-time performance monitoring of communication links allows incipient transmission link failures to be identified prior to their occurrence, and a timely responsive or corrective action instituted. Transmission techniques that are not transparent to the data bits typically employ a parity check or cyclic redundancy check (CRC) built into the transmission frame. For example, the widely employed Synchronous Optical Network (SONET) standard utilizes the Bit Interleaved Parity (BIP) technique. The parity violation rate at the receiver is an accurate measure of the BER over a wide range of BER values. It is also possible to monitor the BER by keeping track of violations of the line coding algorithm employed for symbol transmission.

In transmission systems known as data transparent links, the data bits are not accessed with reference to a particular transmission protocol, which precludes the use of parity violation, CRC, or code violation techniques. In transmissions of this type, the sequence of bits does not contain any standard, repeated sequences that can be relied on to evaluate the accuracy of transmission. In such systems, a method known as pseudo error monitoring can be used. In one such method an incoming stream of data symbols is sampled using at least two different methods, and the results are compared. If they agree for a particular data bit, that bit is assumed accurately received; if they disagree, the reception is assumed to be an error. An error rate calculated according to this method is termed a pseudo error rate (PER).

A number of prior art patents have addressed the above problem by generating one or more additional samplings of the incoming bit stream to compare with the main signal path data. U.S. Pat. No. 4,367,550 describes sampling each data bit at three separate instants of time during each bit period, once in the center for the main signal path data, and once on each side of center, i.e. once before and once after the center of the time period of the data bit. The method combines the two off-center samplings to generate data to compare with the main signal data. If the two agree, the bit is considered accurate; if they do not agree, it is considered a pseudo error, i.e., it is not known in fact that the main signal path data indication is in error, but it is highly questionable. This patent uses the data to determine a bit error rate (BER). This patent argues that a single, independent data point taken off-center yields an inaccurate result due to the slope of the bit pulse curve, and proposes that the aggregation/combination of the two samplings results in a pseudo error count that is much less sensitive to the precise offset of the samplings from the center. While U.S. Pat. No. 4,367,550 correctly identifies the sensitivity of the pseudo error rate to the precise offset in the timing instant, it fails to recognize that bit error rate curves (such as FIG. 2 of the patent) are usually plotted on a semi-logarithmic scale, i.e. X-axis linear, but Y-axis logarithmic. Thus, the Curve 3 of FIG. 2 in the patent will not possess the degree of "significantly lesser dependence on shifts of the scanning moment" as claimed. Further, in FIG. 2 of the patent, the two pseudo error rate curves corresponding to sampling instants B and C of FIG. 1 are ambiguously and questionably juxtaposed on the same X-axis. It is readily evident that the pseudo error rate curves will actually exhibit a variation with sampling instant as shown in FIG. 1 of the present disclosure. If in fact FIG. 2 of the patent exhibits the two curves offset in some manner along the X-axis, then the "combination" curve combines data from different portions of the bit period. This procedure is questionable since, in general, the received data symbols need not be symmetric about a vertical line passing through the center of the bit period. It should be also noted that the data bits produced by sampling the main signal path are used as the reference for judging the veracity of the bits generated by off-center sampling. Hence, any posited relationship between the pseudo error rate and the inherent BER of the main signal path is insubstantial by definition.

U.S. Pat. No. 5,333,147 describes a method for counting the number of times a signal invades predetermined areas on a digital display, giving an indication of a pseudo error rate. This method has the disadvantage of being very complex to implement. U.S. Pat. No. 3,721,959 defines a rectangular region in what is known as an "eye diagram." An eye diagram is an amplitude vs time display of the incoming data signal, with both positive and negative signals superimposed to give an appearance of an eye. Ideally, this pattern would be rectangular, but due to dispersion and losses in signal transmission it is degraded, causing a reduced amplitude and rounded corners. According to the method, a rectangle inside the eye diagram is defined, and a count is made of the number of times the signal invades the rectangle. This count is used as an indication of the error rate. Again, this technique is complex to implement, requiring a large sampling rate on the principle of a real-time oscilloscope.

In view of the above described prior art methods, it is apparent that there is a need for a more meaningful and simple method of detecting a faulty signal.

SUMMARY OF THE INVENTION

It is therefore an object of the present invention to provide an improved method of estimating the accuracy of transmission in a data transparent digital data communication link.

It is a further object of the present invention to provide a method of comparing information derived from an incoming data symbol stream with a pre-defined reference curve in order to determine the quality of the received data symbols with reference to the intended function of the symbol stream viz; performing accurate data transmission.

Briefly, a preferred embodiment of the present invention includes a method wherein each symbol in an incoming data symbol stream is sampled at the center of each bit period to create a main line data bit stream, and concurrently sampled at a time instant displaced from the center of each bit period to create a second line data bit stream. The amount of time displacement is measured from the center of each bit period, and can vary from a maximum of one half bit period with positive sign to a minimum of one half bit period with negative sign. For measurement purposes, the user can define a set of time displacement values that lie within the defined interval. During each bit period, the digital value of the second line data stream is compared with the digital value for the corresponding bit period in the main line. If the main line and second line digital values are the same, no error is indicated. If they are different, i.e. if, for example, the main line is bit "1" and the second line is bit zero, an error called a pseudo error is entered on a counter. The number of errors counted per number of bits or time is indicated as a pseudo error rate for each point of time displacement in the user-defined set. A pseudo error rate reference curve is independently, and previously determined and stored in a controller that indicates maximum allowable pseudo error rate data as a function of the time displacement from the center of the bit period. The values of the calculated pseudo error rate are compared with the corresponding points on the reference curve, and the deviation from the reference curve is quantified by a newly defined quantity termed a "transmission safety factor". If this factor is below a predetermined level, an alarm/notice is activated to indicate degraded performance. If the calculated pseudo error rate values are higher than the corresponding ordinates of the reference curve, the safety factor takes on a reduced value, thereby indicating a degraded system performance. Subsequently, an alarm signal is output to indicate the degraded system condition, as well as for use in correcting the data transmission system.

An advantage of the present invention is that it provides a more useful quantitative indication of the accuracy of data transmission in data transparent links than is existing in the prior art.

A further advantage of the present invention is that it can be implemented with relatively low cost, uncomplicated circuitry.

IN THE DRAWING

DETAILED DESCRIPTION OF THE PREFERRED EMBODIMENTS

Figure 2:
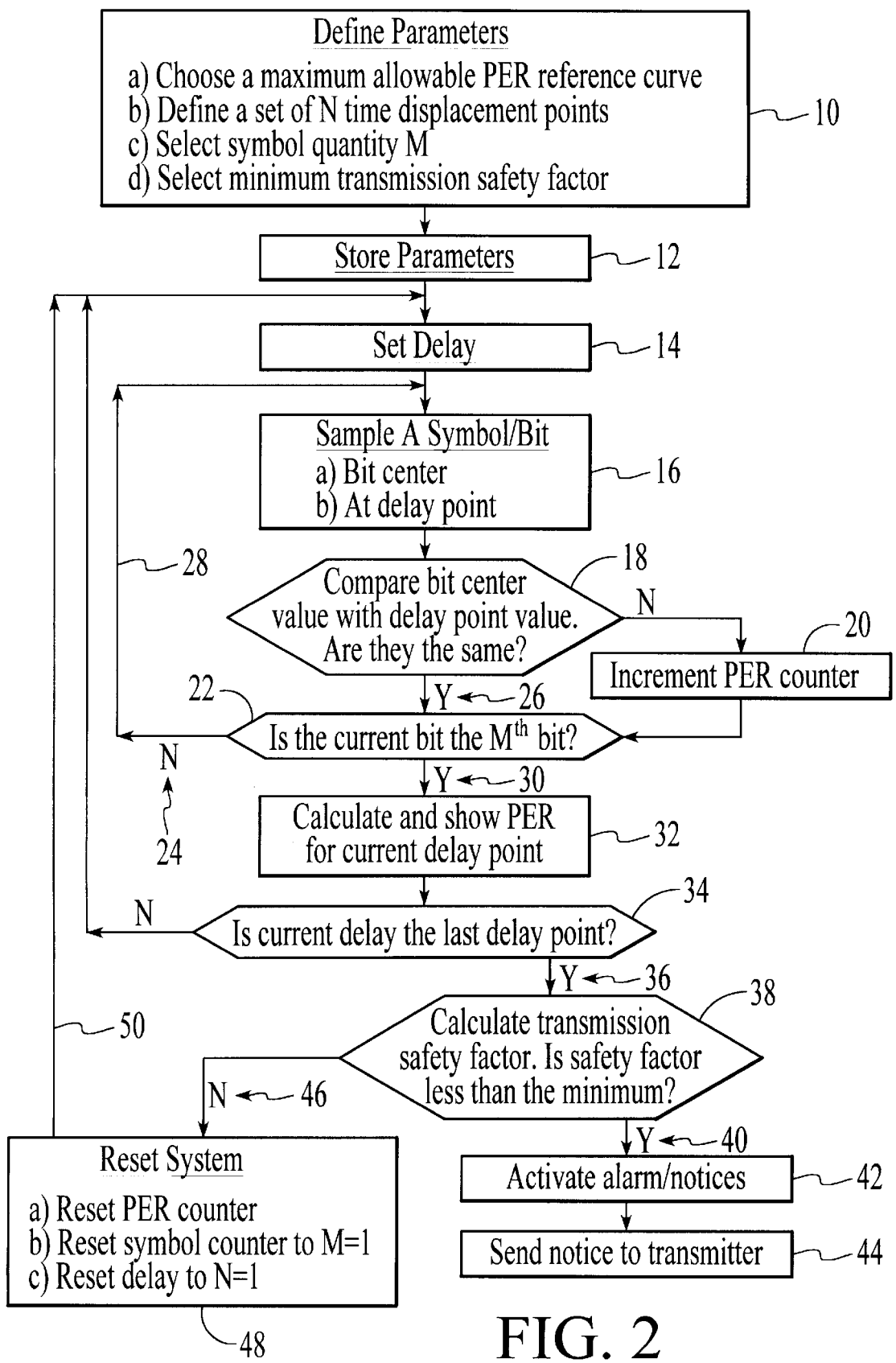
FIG. 2 is a flow chart illustrating the method of the present invention.

The preferred embodiment of the method of the present invention is illustrated in the flow chart of FIG. 2.

The objective of the invention is to analyze an incoming data symbol stream, representing a series of digital "1"s and zeros, for the purpose of determining if the incoming signal is an accurate representation of the original data bit/symbol stream. According to the method of the present invention, a series of M symbols in an incoming data symbol stream is selected. A standard clock recovery circuit makes a determination of the symbol periodicity, and a counter of whole number values is initialized to zero. Each of the M symbols is sampled at the center of the corresponding bit period using a decision circuit to determine a center value indicating a digital "1" or "0" for that symbol. Concurrently, using another decision circuit, each symbol is also sampled at a time instant displaced from the center of the corresponding bit period. The value of this time displacement is one of a set of user defined values lying in the interval from one half bit period with negative sign to one half bit period with positive sign. During the measurement procedure on each series of M data symbols, a single time displacement value is chosen, in serial order, from the user defined set and this value is held constant for that series of M data symbols. If the binary outputs from the two decision circuits for a given bit period disagree, then a quantity termed a pseudo error is logged by incrementing the value of the counter by unity. The number of accumulated, counted errors over the M bits, for the selected time displacement point, is an indication of the pseudo error rate (PER) for that point. A PER is then acquired for a second time delay point by performing the above described operation for another M symbols. This is repeated until a PER has been determined for each delay point. The plurality of PERs corresponding to the plurality of time displacement points defines a PER curve. The method compares the PER curve, or points on the PER curve, to a corresponding reference PER curve, or points on the reference PER curve, and calculates a novel quantity termed a "transmission safety factor". If one or more of the points on the PER curve exceeds the reference PER curve, the safety factor takes on a decreased value, indicative of a degraded transmission signal. If the calculated transmission safety factor decays to a predetermined unacceptable level, an output/alarm is provided for signaling an abnormal condition as well as for the purpose of initiating corrective action.

Figure 1:
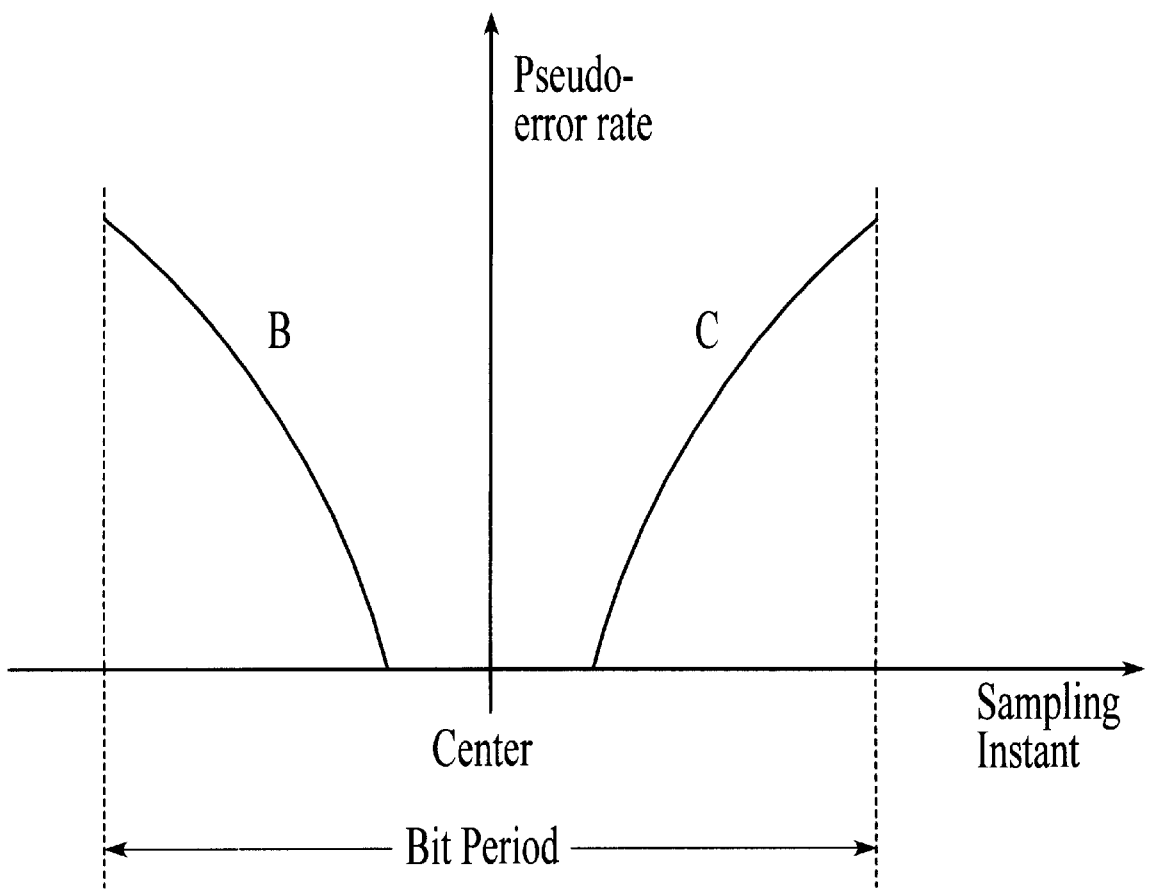
FIG. 1 is a graph illustrating a variation in PER due to a sampling instant variation.

Referring now to FIG. 1, the first step 10 in the method is to set (10) and store (12) a value M of the number of symbols to be sampled for each delay point, a quantity of N time displacement points, a set of selected maximum allowable degraded reference PER curve data, and a minimum allowable safety factor. The reference PER curve data consists of a PER value for each time displacement point of the set of time delay points defined. The amount of error indicated by the curve is not critical, and within limits is arbitrary. If the reference PER values are too small, however, the system will signal a degraded condition even for minor, negligible fluctuations in system performance. If the reference PER values are set too large, the measurement will not be very sensitive to transmission system degradations. The minimum acceptable value for the transmission safety factor is also within limits arbitrary in the same way as the PER reference. As will become clear in the following descriptions, the factor can have a positive or negative value, and a reasonable minimum value could be zero. The reference PER curve data, the minimum safety factor, the value M, and the time delay point data are all stored in a computer/ microcontroller memory (12). The method proceeds with the setting of a delay point (14), and a symbol/bit is sampled, at the bit center, and at the delay point (16). The digital value at the bit center is then compared with the value at the selected delay point (18). If they are different, it is assumed that the data is inaccurate and a PER counter is incremented (20). The method then proceeds to sample the next symbol if the last symbol was not the $M^{th}$ bit, i.e. the last in the selected quantity of the series of M to be sampled. This is indicated by block 22 and the decision 24. If the bit center value and delay point value are the same 26, the counter is not incremented, and if the bit is not the $M^{th}$ bit (22, 24), the method proceeds to sample the next symbol/bit as indicated by the return line 28 going back to step 16. If the last bit is the $M^{th}$ bit 30, the pseudo error rate for the selected delay point is calculated (32) and stored, using the errors indicated by the counter. If the last delay point sampled is not the last in the series of selected delay points (34, 36), the next delay is set (14) and steps 16–34 are repeated until all of the delay points are evaluated as indicated at 36. The transmission safety factor is then calculated (38) using the stored PER values for each delay point, the reference PER points, and the number of delay points. This calculation will be fully described in the following text of the specification.

The calculated safety factor is then compared with the stored minimum safety factor value (38). If the calculated safety factor is less than the minimum acceptable value (40), a notice is given or an alarm is activated (42).

If the safety factor is greater than the minimum (46), the system is reset (48). This involves resetting the PER counter to zero, resetting the symbol count to zero, and resetting the delay to the beginning of the selected series of delays. The system then proceeds to repeat the entire set of steps in FIG. 2 as indicated by line 50.

As a stream of data symbols is received, the method requires sampling M consecutive symbols for each time delay/displacement point. According to the preferred embodiment, the pseudo error rate is measured over M consecutive data bits at each value of the plurality of time displacement points to determine a PER curve of the incoming data stream. In this method the PER measurement is concurrent with the data bit stream. The PER measurement for each time displacement point will last for a time equal to at least M bit periods. Further, the time displacement points are chosen from the user-defined set in serial order. Thus, for random digital data, the method employs different sequences of M consecutive data symbols for the PER measurement at each time displacement point. Owing to a dependence of the received data symbol waveforms on the specific data pattern occurring during the time interval of PER measurement, statistical fluctuations in the measured PER values are likely. The value of M is to be chosen large enough such that these statistical fluctuations are minimized, while keeping the PER measurement time small enough to be meaningful for system restitution in the event of a perceived system degradation. Almost all data transmission protocols with a bit rate in excess of 100 Megabits per second use either transmission data scrambling algorithms or line encoding schemes. Thus, data pattern dependencies become reduced, which will in turn decrease statistical fluctuations in the measured PER values, and hence permit the use of smaller values of M.

The "transmission safety factor" denoted by S is defined as follows: let the number of selected delay points, i.e. elements in the time displacement set be the natural number N. Let i be a natural number less than or equal to N, and let the $i^{th}$ element of the time displacement set be denoted as $D_i$. Let the corresponding reference PER value be denoted by $R_i$, and the corresponding calculated PER value based on the counter reading be $P_i$. The transmission safety factor S is defined by means of the formula:

$$S = \frac{10}{N} \sum_{i=1}^{N} \log_{10}\left(\frac{R_i}{P_i}\right) \quad (1)$$

where:

$$P_i = \frac{1}{M} \sum_{j=1}^{M} E_{ij} \quad (2)$$

with $E_{ij}$ being the error indication for the $j^{th}$ symbol of M consecutive symbols at the $i_{th}$ delay point. $E_{ij}$ is either "0" or "1", as explained above, i.e. if the bit center value does not equal the value at the delay point, the counter is incremented one unit, i.e. $E_{ij}$=1. $R_i$ is the predetermined reference PER for the $i^{th}$ delay point.

Figure 3:
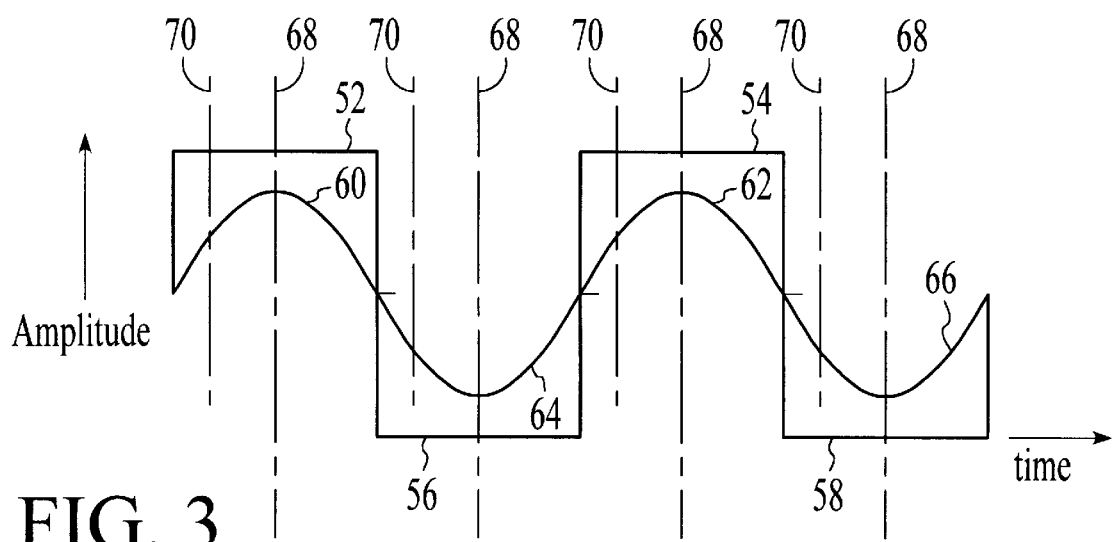
FIG. 3 illustrates the forms of the data signals.

The method will now be explained in further detail in reference to FIGS. 3–6. FIG. 3 illustrates the example of non return to zero (NRZ) symbols for digital "1"s 52 and 54 and digital zeros 56 and 58 as generated by an ideal transmitter. Curve portions 60 and 62 represent a typical degradation of the corresponding symbols 52 and 54 upon arrival at a system receiver following transmission through a communication channel. The signal level is reduced due to losses, and the shape is rounded due to dispersive transmission media factors. Curve portions 64 and 66 similarly represent a degraded form of zero bits 56 and 58. These symbol degradations may be sensitive to the specific series of data bits being transmitted.

According to the method of the present invention, the received data symbol stream is sampled using a decision circuit, the sampling occurring at the center 68 of each bit period, the accuracy of position determined in part by the quality of the data transmission itself and the quality of the clock recovery process. The resulting series of "1"s and zeros at the output of the decision circuit will be noted as the main line. Using a separate decision circuit, each symbol of the incoming data symbol stream, or a faithful real time copy thereof, is sampled at a time instant displaced from the center of the bit period, such as indicated by lines 70, as described previously. The binary output of the second decision circuit will be termed the second line. Each second line data bit is compared with the corresponding main line bit. If the second line and main line agree (both "1"s or both zeros), no error is counted. If they disagree, an error (pseudo error) is recorded for that point by means of a counter, as described previously.

Figure 4:
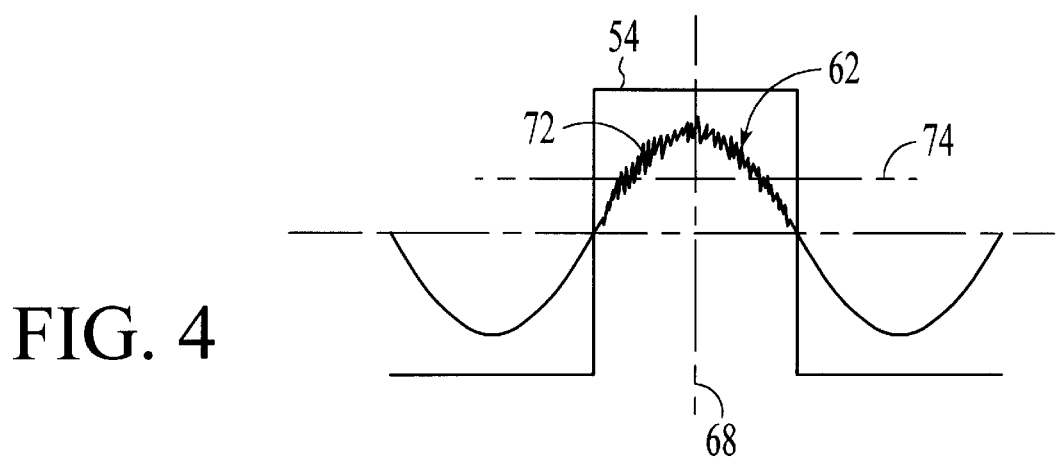
FIG. 4 shows a data signal with superimposed noise level.
Figure 5:
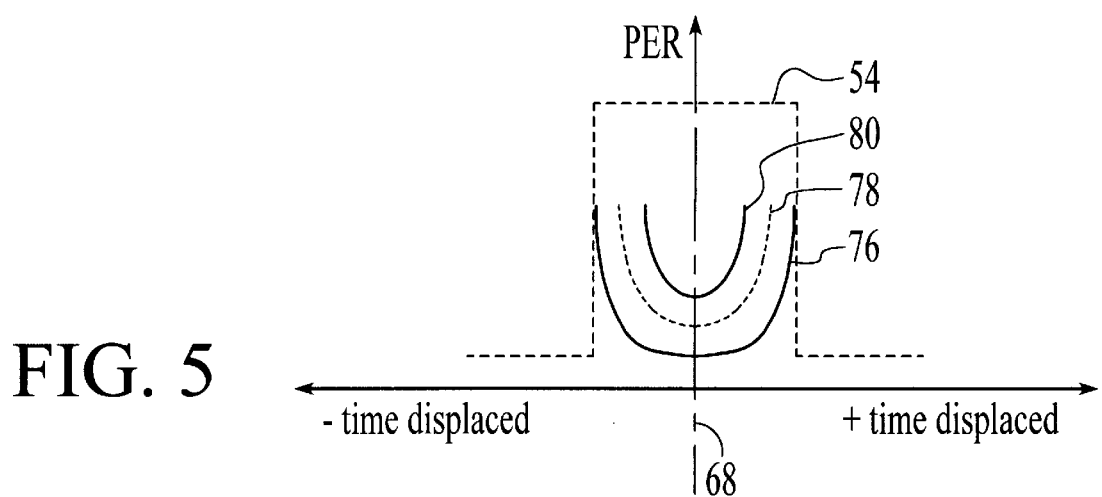
FIG. 5 illustrates the reference pseudo error rate curve.

Referring to FIG. 4, the "1" bit 62 of FIG. 3 is shown distorted with noise 72. Consider the situation where a threshold level for determining a "1" bit is the level of line 74. In a real situation, the number of times the random noise laden curve is likely to cross the threshold 74 will increase as the sampling instant retreats from the center 68. Because of this, a measured pseudo error rate will also naturally increase as the sampling instant retreats from the center 68. A representative plot of the PER as a function of displacement in time from the center is illustrated as curve 76 in FIG. 5. The bit pulse 54 is overlaid as a reference for time, as is the center line 68.

According to the method of the present invention, a maximum allowable PER reference curve is selected. This curve is represented as curve 78 in FIG. 5. Data defining curve 78 is stored for reference as described above. The safety factor referred to above is positive for data points on the curve 76 lying below the reference 78, and represents acceptable data. Data points lying above the reference 78, such as on curve 80, represent unacceptable data and a negative safety factor.

The above described method of the present invention is an improvement over prior art methods. For example, U.S. Pat. No. 4,367,550 combines the two PER versus time displacement curves for positive and negative values of time displacement respectively in order to generate a composite bit error rate curve which is claimed to have a less sensitive dependence on the sampling instant as it is varied across the bit period. In contrast, the method of the present invention advantageously utilizes the sensitive dependence of the PER on the time displacement, a characteristic identified as undesirable in U.S. Pat. No. 4,367,550, in order to detect degradations in the received symbols. The newly defined transmission safety factor, defined by equation (1) above, abstracts the information in the PER versus time displacement curve into a single number that can be used as a metric for the measurement of data transmission accuracy. Further, unlike U.S. Pat. No. 4,367,550, the present method does not measure the bit error rate of the main line data stream. The present method detects degradations in the received data symbols, as evidenced by the measured PER versus time displacement curve (such as curves 76 or 80 in FIG. 5), and the subsidiary parameter of transmission safety factor.

In U.S. Pat. No. 3,721,959 the signal is rejected if it falls within a rectangular area in the eye defined by the incoming signal. The rectangular area is equivalent to a flat reference, which can reject acceptable signals.

The method of U.S. Pat. No. 5,333,147 depends on evaluating each cell in a display area within a defined reference eye area for invasion of the data signal. This method differs from the present invention which calculates the PER for a plurality of time displacement points and gives. notice if the PER exceeds that of a pre-defined reference, the extent of the excess being quantified by the newly defined transmission safety factor. The difference between U.S. Pat. No. 5,333,147 and the present invention is very significant. Implementation of the device of U.S. Pat. No. 5,333,147 is complicated, whereas an implementation of the present invention is relatively simple, as will be described in reference to FIG. 6 of the drawing.

Figure 6:
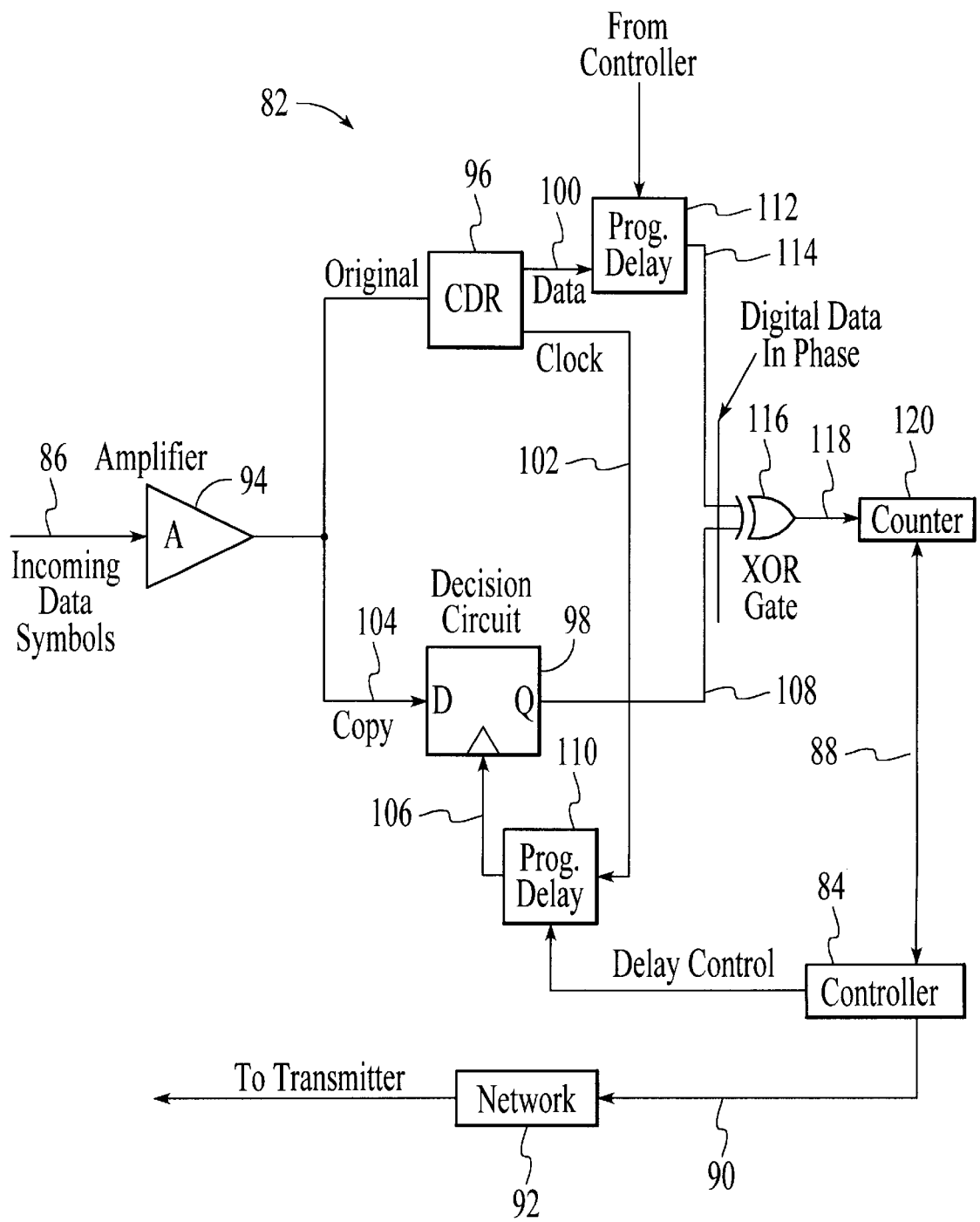
FIG. 6 is a preferred circuit for implementation of the method of the present invention.

A circuit 82 for implementing the method of the present invention as described in reference to FIG. 2 is shown in detail in FIG. 6. The maximum allowable reference PER versus time displacement curve data is determined as described in reference to FIG. 2, and is stored in the controller 84 of FIG. 6. The circuit of FIG. 6 calculates an actual PER versus time displacement curve of a data symbol stream received on line 86, and communicates the resulting calculated/counted PER versus time displacement data to the controller via line 88. The controller then compares it with the stored reference curve. The controller calculates the transmission safety factor defined earlier. If the actual safety factor is smaller than a previously defined reference value, also stored in the controller, the controller outputs a notice/alarm on line 90. The notice on line 90 can be acted upon by a user directly, or the alarm signal output on line 90 can be sent back to the transmitter. A system 92 for such a process will be understood by those skilled in the art and need not be described herein. This system, for example, could be the internet, or e-mail, etc., but preferably the same system that carried the incoming signal on line 86. In turn, the transmitter can institute appropriate remedial or restitutive action in order to improve the data transmission accuracy.

The circuit 82 determines the PER as follows. The incoming data symbol stream on line 86 is preferably amplified by amplifier 94, and then is connected to both a clock data recovery (CDR) circuit 96 and a decision circuit 98. The CDR 96 is a standard device such as a MAXIM model MAX3875. The function of the CDR is to recover a clock signal from the data symbol stream and to sample the incoming symbols at the center of each data bit transmission period, and output at 100 a clean binary data signal. For example, FIG. 3 exemplifies a clean data signal with digital "1"s 52 and 54 and zeros 56 and 58. The bit period centers are noted as items 68. The CDR also outputs a clock pulse at 102 indicative of the sampling instants. The decision circuit 98 is identical to that employed in the CDR and samples the incoming signal at 104 when a clock pulse is input at 106. If the signal at 104 is above a threshold level, an output at 108 is applied indicative of a digital "1". If the signal is below that level, the output at 108 is indicative of a digital zero. The pulse at 106 is delayed in time with respect to the clock pulse at 102 by a programmable delay circuit 110. An additional programmable delay 112 is placed in-line with the output 100 of the CDR 96.

Delay circuit 112 is set by controller 84 to cause the signals on lines 114 and 108 to arrive at the XOR gate 116 at the same time with the respective pulse edges coincident regardless of the time of sampling by the decision circuit 98 relative to the time of sampling by the CDR 96. The XOR gate 116 compares the inputs on 114 and 108. If these inputs are the same (both digital "1"s or both zeros), no output at 118 is sent. If the inputs are different, an output appears at 118 which indicates a pseudo error and increments the counter 120.

In operation, the controller 84 stores a program including data for a series of N delay offsets between the CDR 96 sampling time and the decision circuit 98 sampling time for the purpose of gathering data to construct the PER curve. A user defined reference safety factor is also stored in the controller, as well as the number of symbols M to be sampled in a series. The controller then sequentially sets the delay circuits 110 and 112 for the various delay points within the bit period. The XOR gate 116 compares each set of outputs at 108 and 114, and if they are different, sends the resulting error signal to the counter 120. The counter 120 stores the accumulated count for the M symbols evaluated at each delay point in a designated register. The operation of the counter proceeds by first resetting its count value to zero, and then enabling the counter operation for a duration of M bit periods for each of the N delay points as discussed previously. The PER for each delay is the sum of the errors counted for the M symbols measured at that delay. For each point/delay, the controller 84 compares the PER of the counter with the PER reference stored in the controller, and the transmission safety factor S is calculated as described earlier. If the measured safety factor is less than the reference safety factor value stored in the controller, the controller outputs a signal at 90, i.e. an alarm which can be used in a number of ways to notify a user that the data being received may be in error. A preferred embodiment includes the controller sending a signal back through the network 92 to the transmitter.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of estimating the accuracy of communications data, comprising:

(a) determining a maximum allowable reference pseudo error rate curve and a minimum allowable transmission safety factor, for use in estimating accuracy of symbol data in an incoming symbol data stream, said incoming symbol data stream having been transmitted over a data transparent communications link;

(b) determining a symbol data transmission safety factor for said incoming symbol data stream; and (c) providing a notice indicating inaccurate symbol data if said symbol data transmission safety factor is less than said minimum allowable transmission safety factor.

2. A method as recited in claim 1 wherein said determining a symbol data transmission safety factor includes:

(a) first calculating first digital bit values to create a clean main line data symbol stream by sampling said incoming symbol data stream at a center of each symbol to determine if each said bit value of said clean main line stream is a digital "1" or a digital zero;

(b) second calculating second digital bit values to create a second line data stream by sampling a plurality of selected symbols of a real time copy of said incoming data symbol stream by sampling said copy at a plurality of time-displaced points within a bit period of each selected symbol;

(c) comparing each said second digital bit value at each said point in said second line of data with a corresponding said first digital bit value in a corresponding bit of said main line, and if said first value and said corresponding second value are different, adding a pseudo error to a sum which, when added for a particular said time-displaced point for all of said plurality of selected symbols, said sum is used to calculate said pseudo error rate for said point; and (d) comparing each said calculated pseudo error rate with said reference pseudo error rate for a corresponding point on said curve to calculate said transmission safety factor.

3. A method as recited in claim 1 wherein said determining a symbol data transmission safety factor includes:

(a) first measuring a selected incoming data symbol of said incoming symbol data stream to determine a central value at a center of a period of said first data symbol to determine whether said central value of said first symbol is a digital "1" or a digital zero;

(b) second measuring said selected data symbol at a second time, said second time delayed from said center a first delay within said period, said second measuring for determining a second value of said selected data symbol;

(c) incrementing a counter if said second value is not the same as said first value;

(d) repeating steps a, b, and c for a selected plurality of data stream symbols to determine a pseudo error rate for said first delay; and (e) repeating steps a, b, c, and d for a plurality of values of said first delay to determine an incoming symbol pseudo error rate curve; and (f) calculating said transmission safety factor using data points from said incoming symbol pseudo error rate curve and data points from said reference pseudo error rate curve.

* * * * *